(12) United States Patent
Mallick et al.

(10) Patent No.: US 8,392,262 B2
(45) Date of Patent: Mar. 5, 2013

(54) METHOD AND APPARATUS FOR SELECTING A PICKUP LOCATION BASED ON CUSTOMER LOCATION

(75) Inventors: Martyn Mallick, Baden (CA); Christopher Smith, Burlington (CA)

(73) Assignee: Research In Motion Limited (CA)

( * ) Notice: Subject to any disclaimer, the term of this patent is extended or adjusted under 35 U.S.C. 154(b) by 170 days.

(21) Appl. No.: 12/017,569

(22) Filed: Jan. 22, 2008

(65) Prior Publication Data

US 2009/0187489 A1 Jul. 23, 2009

(51) Int. Cl.
*G06Q 30/00* (2012.01)
(52) U.S. Cl. .............. 705/26.1; 705/27.1; 705/26.2; 705/26.8; 705/26.9
(58) Field of Classification Search .............. 705/26, 705/27, 26.1, 27.1
See application file for complete search history.

(56) References Cited

U.S. PATENT DOCUMENTS

| | | | |
|---|---|---|---|
| 6,880,750 B2 | 4/2005 | Pentel | |
| 2001/0049636 A1* | 12/2001 | Hudda et al. ................ | 705/26 |
| 2002/0026380 A1 | 2/2002 | Su | |
| 2002/0087522 A1* | 7/2002 | MacGregor et al. ............ | 707/3 |
| 2002/0143655 A1 | 10/2002 | Elston et al. | |
| 2003/0061303 A1 | 3/2003 | Brown et al. | |
| 2003/0125963 A1 | 7/2003 | Hacken | |
| 2003/0212996 A1 | 11/2003 | Wolzien | |
| 2004/0024650 A1 | 2/2004 | Chen et al. | |
| 2006/0079247 A1 | 4/2006 | Ritter | |
| 2006/0106674 A1 | 5/2006 | Muller | |
| 2007/0077944 A1 | 4/2007 | Bellenger et al. | |
| 2007/0136140 A1* | 6/2007 | Smith ......................... | 705/26 |

FOREIGN PATENT DOCUMENTS

| | | |
|---|---|---|
| WO | WO00/39722 A1 | 7/2000 |
| WO | WO2008005140 A1 | 1/2008 |

OTHER PUBLICATIONS

Nearbynow.com.
Slifter by GPShopper; www.slifter.com.
"Canadian Application Serial No. 2712789, Office Action mailed May 1, 2012", 3 pgs.
"Chinese Application Serial No. 200980109153.7, Final Office Action mailed Feb. 13, 2012", w/ English Translation, 9 pgs.
"Chinese Application Serial No. 200980109153.7, Response filed Jan. 20, 2012 to Office Action mailed Dec. 1, 2011", 8 pgs.
"Chinese Application Serial No. 20098010953.7, Office Action mailed Sep. 8, 2011", 7 pgs.
"European Application Serial No. 08150523.2, European Search Report Mailed Aug. 18, 2008", 7 Pgs.
"European Application Serial No. 08150523.2, Office Action mailed Nov. 15, 2011", 6 pgs.
"Canadian Application Serial No. 2,712,789, Response filed Nov. 1, 2012 to Office Action mailed May 1, 2012", 18 pgs.

\* cited by examiner

*Primary Examiner* — Courtney Stopp
(74) *Attorney, Agent, or Firm* — Schwegman Lundberg Woessner P.A.

(57) ABSTRACT

A method and apparatus for determining a pickup location for an item selected in an online transaction based on location information or data. The method comprises obtaining location data for the mobile communication device and determining availability of the selected item at one or more locations based on proximity to the location. According to an embodiment, one of the locations with item availability is selected and the online transaction is completed.

21 Claims, 5 Drawing Sheets

METHOD AND APPARATUS FOR SELECTING A PICKUP LOCATION BASED ON CUSTOMER LOCATION

FIELD OF THE APPLICATION

The present application relates to electronic commerce, and more particularly, to a method and apparatus for determining a pickup or delivery location based on customer location and/or preferences in an e-commerce transaction for a mobile communication device in a wireless network.

BACKGROUND OF THE APPLICATION

Electronic commerce, or e-commerce, solutions may be broadly divided into two types of enterprises. The first is a virtual enterprise comprising an e-commerce site having no physical store or location which is accessible by clients. The second is a traditional brick and mortar establishment (for example, an electronics retailer or a music retailer) having both physical store(s) and an e-commerce site for online purchasing.

For a virtual e-commerce enterprise the purchased goods are delivered to the consumer or client using a postal or courier service and for certain goods, such as software, electronic delivery may also be used. Similarly, traditional brick and mortar establishments with an e-commerce site use postal or courier services to deliver purchased goods to the client. A trend in traditional brick and mortar and e-commerce establishments is to offer the options of delivery or in-store pickup by the customer. In-store pickup offers a customer with an opportunity to save on shipping charges and/or get the purchased goods quicker.

However, current solutions for in-store pickup are not tailored to transactions with mobile communication devices. Accordingly, there remains a need for improvements in the art for e-commerce or online transactions with in-store customer pickup.

SUMMARY

The present application is directed generally to a method and apparatus for determining a pickup or delivery location based on a customer location and/or preferences in an e-commerce transaction for a mobile communication device in a wireless network.

Other aspects and features will become apparent to those ordinarily skilled in the art upon review of the following description of embodiments in conjunction with the accompanying figures.

BRIEF DESCRIPTION OF THE DRAWINGS

Reference will now be made to the accompanying drawings which show, by way of example, embodiments of the methods and systems described herein, and how they may be carried into effect, and in which.

Like reference numerals indicate like or corresponding elements in the drawings.

DETAILED DESCRIPTION OF THE EMBODIMENTS

Embodiments of the present invention are generally directed to a method and apparatus for determining a pickup location for an item purchased by a client in an e-commerce (i.e. online) transaction based on the location of the client's mobile communication device.

According to an embodiment, there is provided a computer-implemented method for determining a location for pickup of an item for purchase in an on-line transaction with a retailer system using a mobile communication device, the method comprises the steps of: obtaining location data associated with the mobile communication device; obtaining data for one or more locations associated with the retailer system; processing the device location data and the retailer system associated location data to determine, based on proximity of the retailer system associated locations to the device location data, one or more retailer system associated locations as a pickup location of an item of purchase; determining availability of the item at the one or more retailer system associated locations; selecting one of the one or more retailer system associated locations with item availability; and completing the on-line transaction and making location data for the selected one of the retailer system associated locations available at the mobile communication device.

According to another embodiment, there is provided a computer-implemented method for determining a location for pickup of an item for purchase in an on-line transaction with a retailer system using a network enabled device, the method comprises the steps of: obtaining location data associated with the network enabled device; obtaining data for one or more locations associated with the retailer system; processing the retailer system location associated data to determine a number of the retailer system associated locations having the item available for pickup; providing location data for the number of the retailer system associated locations determined as having item availability; processing the location data for the number of the retailer system associated locations and the device associated location data to determine, based on proximity of the number of retailer system associated locations to the device associated location, one or more of the retailer system associated locations as a pickup location for the item; selecting one of the one or more retailer system associated locations; and completing the on-line transaction and making location data for the selected one of the retailer system associated locations available to the network enabled device.

According to another embodiment, there is provided a server for determining a pickup location for an item selected in an online transaction with a retailer system, the server comprises: a module configured to obtain location data for a location associated with an electronic device configured to process the online transaction; a module configured to obtain data for locations associated with the retailer system; a module configured to process the device associated location data and the retailer system associated location data to determine one or more retailer system associated locations as a pickup location for an item based on proximity of the one or more retailer system associated locations to the associated location; a module configured to determine availability of the selected item at the one or more retailer system associated locations; a module configured to select one of the one or more retailer system associated locations with availability of the selected item; a module configured to complete the on-line transaction; and a module configured to make location data for the selected one of the retailer system associated locations available at the electronic device.

According to yet another embodiment, there is provided a device configured to conduct an online transaction with a retailer server, the device comprises: a component configured to transmit data comprising an item selection to the retailer server; a component configured to receive data comprising one or more locations associated with the retailer server having the selected item; a component configured to obtain data comprising a location associated with the electronic device; a component configured to select one of the one or more locations associated with the retailer server based on proximity of the one or more retailer server associated locations to the device associated location; and a component configured to transmit data comprising the selected retailer server associated location to the retailer server.

According to a further embodiment, there is provided a computer program product for determining a location for pickup of an item for purchase in an on-line transaction with a retailer by a client using a mobile communication device, the computer program product comprises: a storage medium configured to store computer readable instructions executable by a processor; the computer readable instructions comprising, obtaining location data associated with the mobile communication device; obtaining data for one or more locations associated with the retailer system; processing the device location data and the retailer system associated location data to determine, based on proximity of the retailer system associated locations to the device location data, one or more retailer system associated locations as a pickup location of an item of purchase; determining availability of the item at the one or more retailer system associated locations; selecting one of the one or more retailer system associated locations with item availability; and completing the on-line transaction and making location data for the selected one of the retailer system associated locations available at the mobile communication device.

Figure 1:
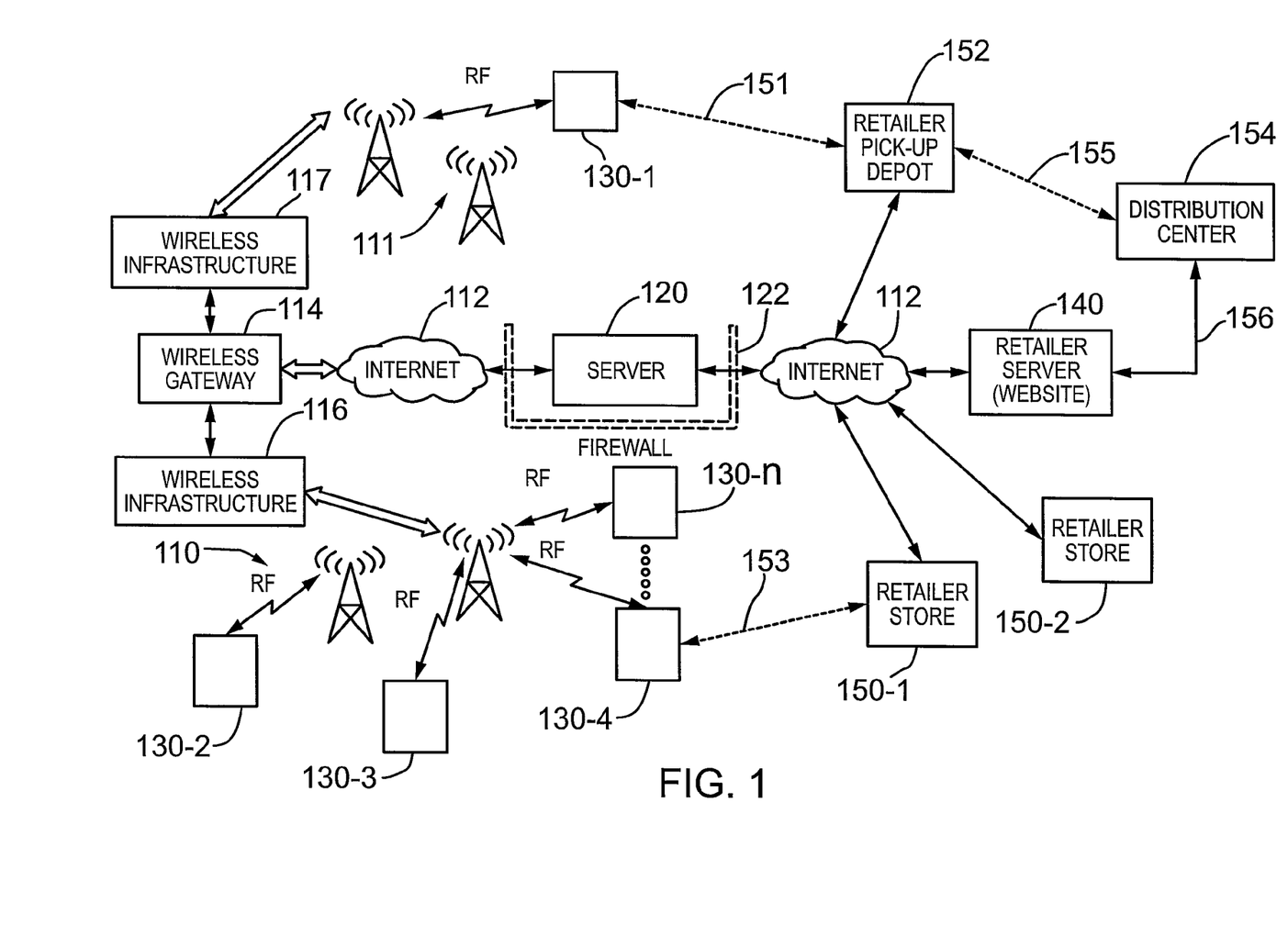
FIG. 1 shows in diagrammatic form an exemplary network configuration according to an embodiment.

Reference is first made to FIG. 1, which shows in diagrammatic form an exemplary network environment or configuration 100 wherein an embodiment as described herein may be practiced. The network environment 100 comprises a wireless network indicated by references 110 and 111, the Internet 112, a wireless gateway 114, a wireless infrastructure indicated by references 116 and 117, a server 120 and a web server 140. The wireless network 110 and 111 serves a plurality of users or clients, each having a mobile communication device 130, indicated individually as 130-1, 130-2, 130-3 . . . 130-n.

The wireless gateway 114 and the wireless infrastructure 116 and 117 provide a link between the Internet 112 and the wireless networks 110,111. The wireless infrastructure 116 and 117 determines the most likely network for locating a given user and tracks the users as they roam between countries or networks. A message is then delivered to the mobile communication device 130 via wireless transmission, typically at a radio frequency (RF), from a base station in the wireless networks 110, 111 to the mobile device 130. The wireless networks 110, 111 may comprise any wireless network over which messages may be exchanged with a mobile communication device.

The wireless infrastructure 116 and 117 includes a series of connections to the wireless networks 110, 111. These connections could be Integrated Services Digital Network (ISDN), Frame Relay or T1 connections using the TCP/IP protocol used throughout the Internet. As used herein, the term "wireless network" is intended to include three different types of networks: (1) data-centric wireless networks, (2) voice-centric wireless networks and (3) dual-mode networks that can support both voice and data communications over the same physical base stations. Combined dual-mode networks include, but are not limited to, (1) Code Divisional Multiple Access (CDMA) networks, (2) the Group Special Mobile or the Global System for Mobile Communications (GSM) and the General Packet Radio Service (GPRS) networks, and (3) future third-generation (3G) networks like Enhanced Datarates for Global Evolution (EDGE) and Universal Mobile Telecommunications Systems (UMTS). Some older examples of data-centric networks include the Mobitex™ Radio Network and the DataTAC™ Radio Network. Examples of older voice-centric data networks include Personal Communication Systems (PCS) networks like GSM, and TDMA systems.

The mobile communication devices 130 comprise originating clients. The originating client, for example, a web browser, is typically referred to as the "user agent". The originating clients utilize the wireless network 110,111 and wireless infrastructure 116,117 to communicate with a destination server. The destination server stores resources, such as, HTML files and images, and is typically referred to as the "origin server". In between the user agent and the origin server there may be several intermediaries, for example, proxies and gateways. In the context of the present application, the mobile handheld devices 130 comprise user agents, the server 120 comprises an intermediary server, and the web server 140 comprises an origin server. According to an embodiment, the intermediary server 120 is located or configured behind a firewall indicated by reference 122 in FIG. 1.

In the context of the present description, the web server 140, i.e. the "origin server", comprises a server for a retailer with an e-commerce enterprise or facility. As depicted in FIG. 1, the retailer comprises retail stores 150-1 and 150-2, a pickup center or depot 152, and a distribution center or warehouse 154. The web server 140 for the retailer (i.e. the "retailer server") is coupled to the distribution center or warehouse 154 via a communication link 156. The web server 140 may also be coupled to the retail stores 150 and/or the pickup center 152 by a communication link, for example, via the Internet 112. The communication links with the distribution center 154, the retailer pickup depot 152 and/or the individual retail stores 150 allow the retailer server 140 to determine product availability at specific physical locations. In the context of the present description, the term store (or stores) is used to designate the retail stores, the pickup depot 152 and the distribution center 154, or any other facilities associated with the retailer that are available of in person or in-store pickup of items purchased from the retailer. It will be appreciated that other communication links or inventory mechanisms may be utilized. According to an embodiment, the retailer server 140 is configured to provide a user agent with pickup location(s) based on the physical location of the user's mobile communication device 130 as will be described in more detail below.

Referring again to FIG. 1, the server 120 may be implemented, for example, on a network computer within a corporate entity, a computer within an ISP system or as part of a public server infrastructure. The server 120 provides an interface for web access on the Internet 112 for mobile communication devices 130 equipped with a browser or having browser capability as will be described in more detail below.

Figure 2:
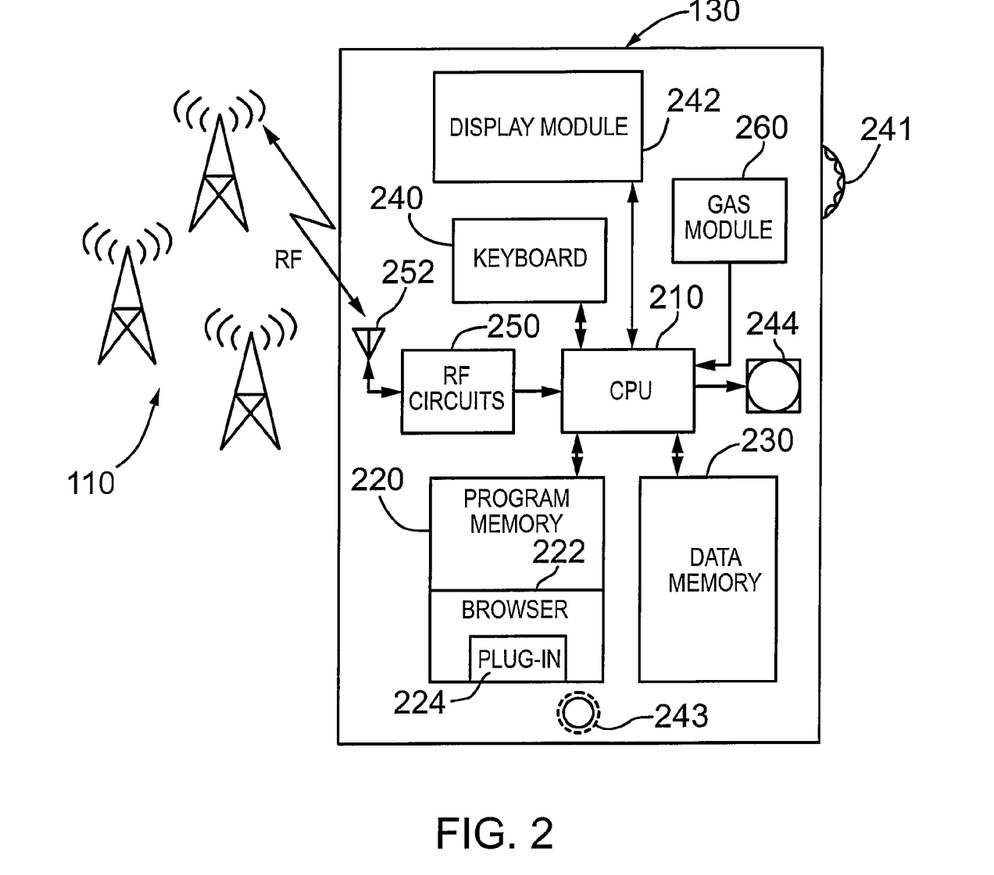
FIG. 2 shows in diagrammatic form an exemplary mobile wireless communication device which is capable of operating within the network environment of FIG. 1.

Reference is made to FIG. 2, which shows in more detail an exemplary implementation of the mobile communication device 130. The mobile communication device 130 comprises a central processing unit or CPU 210. The CPU 210 operates under the control of a program (i.e. firmware or software) stored in program memory 220. The CPU 210 is also provided with data memory 230. The CPU 210 is also operatively coupled to an input device 240 (for example, a keyboard, a touch sensitive overlay or a voice activated input device) and a track wheel 241 or a trackball 243 (shown in broken outline), a display module 242 and an audio transducer or speaker 244. In addition to the program executable code provided for performing the functions associated with the operation of the mobile communication device 130, the program memory 220 includes a browser program 222. The browser program 222 allows a user to access web pages (i.e. HTTP browsing) over the Internet 112 using the mobile communication device 130, i.e. utilizing a graphical user interface comprising, for example, the keyboard 240 and the display module 242 and/or the track wheel 241 (or the trackball 243). HTTP browsing comprises using HTTP (Hypertext Transfer Protocol) which comprises a request response protocol in which parameters a request are set before the request is sent. According to an embodiment, the mobile communication device 130 includes a program module indicated generally by reference 224. The program module 224 is configured to provide functionality associated with selection of a physical store for pickup and location determination as described in more detail below. The program module 224 may be implemented as a plug-in for the browser 222 according to an embodiment. According to another embodiment, the program module 224 is implemented to provide communication with the retailer server 140 via an Application Program Interface or API.

As depicted in FIG. 2, the mobile communication device 130 includes a RF, demodulation/modulation and decoding/coding circuits 250, and a suitable RF antenna 252. The RF demodulator/modulator and decoder/coder circuits 250 and the RF antenna 252 are operatively coupled to the CPU 210 and provide an interface for wireless communication with the wireless network 110. The particular implementation details of the RF circuits will be within the understanding of those skilled in the art, and are therefore not described in further detail.

To locate an e-commerce site (i.e. the retailer server 140), the user invokes the browser program 222 in the mobile communication device 130 and using the graphical user interface (i.e. the display 242, the keyboard 240 and/or a thumb-operated track wheel 241 or track ball 243) enters the URL or a bookmark for a website of interest, for example, http://www.futureshop.ca. The browser 222 provides a user interface (UI) for the mobile device 320 (i.e. the client). The browser 222 communicates with the retailer server 140 (for example, the server for "futureshop.ca") to fetch web pages, for example, using HyperText Transfer Protocol or HTTP. According to one embodiment, the browser 222 converts the user entry into a HTTP request and sends the request to the server 120. The server 120 relays the HTTP request to the retail server 140, i.e. the destination server. In response to the request, the retail server 140 returns the requested or corresponding webpage to the mobile communications device 130.

According to an embodiment the webpage(s) received from the retailer server 140 comprise one or more HTML based pages that provide the capability for the user to make a purchase in an e-commerce or online transaction. According to an embodiment, the retailer server 140 is configured to provide the user with one or more physical store or pickup locations for picking up the purchase. As will be described in more detail below, the physical store or pickup locations (i.e. brick and mortar) are determined or presented to the user agent based on the location of the user agent (i.e. the mobile communication device associated with the user) or based on a pre-defined location associated with the user agent. As will also be described in more detail below, the physical store or pickup location may be filtered according to user preferences or settings.

Figure 3:
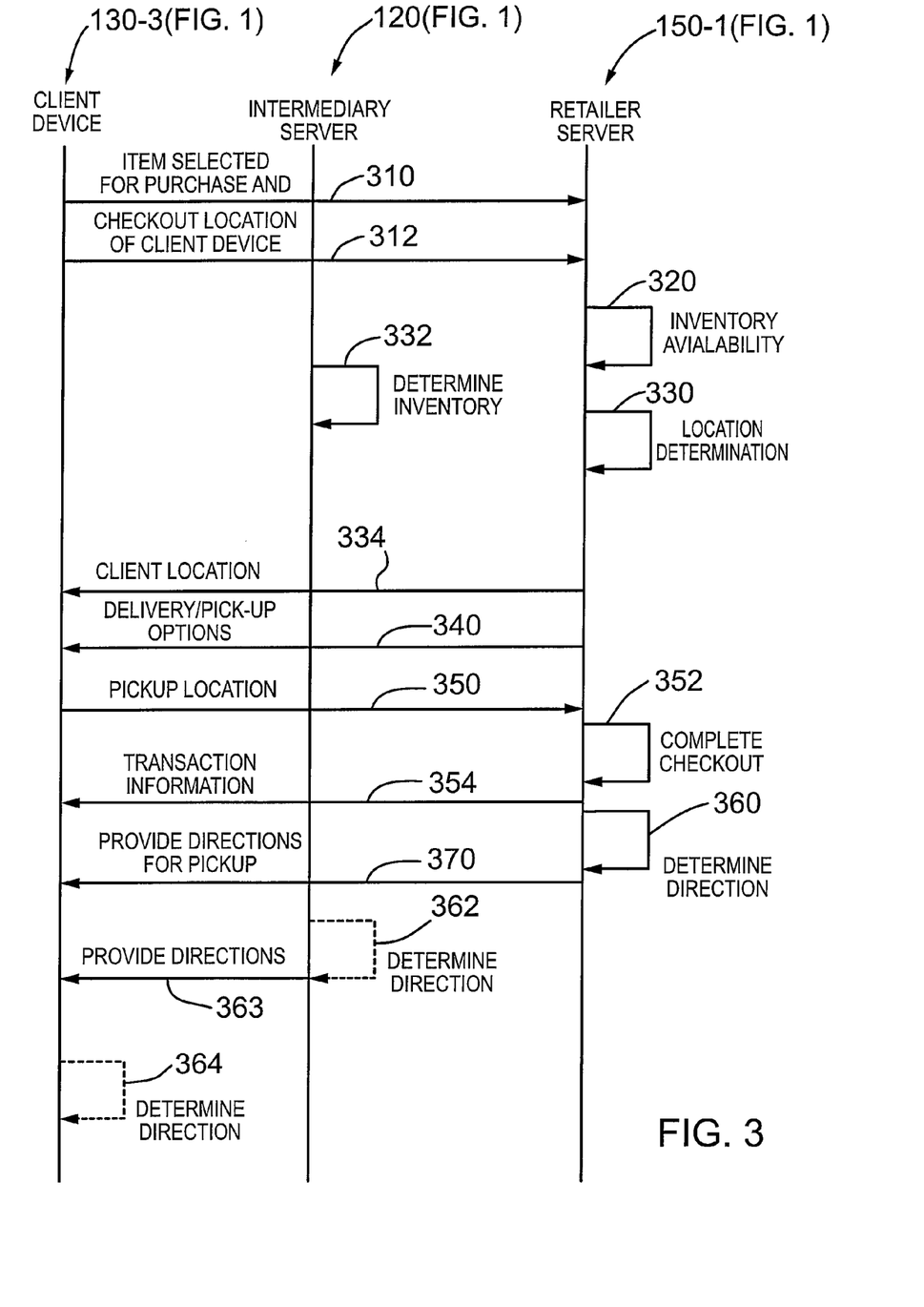
FIG. 3 is a process flow diagram for a mobile communication device and server configuration according to an embodiment.

Reference is next made to FIG. 3, which shows process flow between a mobile communication device 130, i.e. the client device, and the retailer server 140 (i.e. a "destination server") according to an embodiment. The process flow between the client device (e.g. the mobile communication device 130-3 in FIG. 1) as indicated by reference 310 comprises the client selecting an item or items for purchase from the web pages downloaded from the retailer server 140 and proceeding to "checkout" in order to complete the transaction. Checkout typically comprises transmitting identifier(s) for the selected item(s) (e.g. items in the user's shopping cart) and transmitting payment information (e.g. credit card or debit card) to the retailer server 140, although in some embodiments, some of the information such as the payment information may not need to be transmitted from the mobile communication device 130-3 as that information may already be stored at the retailer server 140, or may be transmitted to the retailer server 140 from a remote data storage site. According to an embodiment, the transmission of data between the client device 130-3 and the retailer server 140 is through the use of the intermediary server 120. According to another embodiment, the transmission of data is directly between the client device and the retailer server. According to an embodiment, the current location of the client device is transmitted to the retailer server 140, as indicated by reference 312. For example, the mobile communication device 130 includes a GPS (Global Positioning System) module 260 (FIG. 2) and the browser 222 is configured to provide the client location based on the GPS module 260. According to another embodiment, the location of the mobile communication device 130 is determined using other techniques, for example, using cellular tower location (e.g. triangulation; signal propagation rate), and the browser 222 is configured to transmit this location information to the retailer server 140. According to another embodiment, a location defined by client (i.e. a pre-defined location) is transmitted instead of the current location. The pre-defined location is set by the client and may comprise a location associated with the client or more convenient for the client, for example, the location of the client's workplace, the location of a place that the client will be visiting or attending. According to another embodiment, the pre-defined location may be stored at the retailer server 140, or may be transmitted to the retailer server 140 from a remote data storage site.

The retailer server 140 receives the selection of items (e.g. the shopping cart contents) and the current location or pre-defined location of the client, and is configured to determine the availability of the selected item(s) at the physical locations associated with the retailer, as indicated by references 320 and 330. For the exemplary embodiment depicted in FIG. 1, the physical locations associated with the retailer server 140 include the retailer stores 150 and the retailer pick-up depot 152. The distribution center or warehouse 154 may also be included as a pickup location, for example, if public access is provided. As indicated by reference 330, the retailer server 140 is further configured to determine the store or facility having the item in inventory which is closest to the client, as determined based on the current location of the client's mobile communication device 130 or the pre-defined location associated with the client. According to another embodiment, the intermediary server 120 is configured to determine the location of the store having the item in stock, as indicated by reference 332.

According to another embodiment and as indicated by reference 334, the mobile communication device 130 is configured to determine the location of the nearest store having the item in stock, for example, based on the current position of the mobile communication device 130 (or the pre-defined location provided by the client) and store information provided by the retailer server 140. For example, the retailer server 140 can be configured to provide location information (e.g. store address information) of the store(s) having the item available or in stock, and the mobile communication device 130 is configured to use the location information from the server 140 to determine which store is closest the current location (or the pre-defined location), for example, using a mapping program or component.

According to an embodiment, the retailer server 140 is configured to determine proximity or nearness of stores with item availability to the location of the client based on one or more distances. The distances may vary according to geographical area and/or number of retailer stores in a locale or area. According to another embodiment, the distance (e.g. maximum distance) for determining proximity or nearness to the client can be set or defined by the client, for example, as a preference, or a setting transmitted from the client's mobile communication device. According to another embodiment, the distance for determining proximity to the client may be varied according to item availability. For example, if the item is not available at stores within a first distance to the client, the distance may be increased to include store(s) that are farther away but have the selected item(s) in stock or inventory. According to an embodiment, the retailer server 140 is configured to increase the distance automatically based on item availability. According to another embodiment, the retailer server 140 is configured to increase the distance in response to an input from the client, for example, based on a pre-defined client preference, or for example, based on an in-transaction request/response from the client.

According to an embodiment and indicated by reference 340, the retailer server 140 is configured to provide the user with the delivery/pickup options based on the stores closest to the current location (or pre-defined location) of the user. According to another embodiment, the user is provided with the capability to preselect or predefine one or more store locations, and if one or more of the preselected stores have the item in inventory, the retailer server 140 is configured to provide the preselected store(s) with the item in stock to the mobile communication device 130 of the client. If the client decides to the pick the item up at a store (as opposed to having it shipped), the client selects one of the stores for the in-store pickup, or otherwise indicates an in-store pickup, and the store location is transmitted to the retailer server 140 as indicated by reference 350. According to an embodiment, the retailer server 140 is configured to compute the transaction value to the client and complete the checkout process once the selected location for in-store pickup is received, as indicated by reference 352. The completion of the checkout process and/or the transaction value are transmitted to the client device, as indicated by reference 354.

As indicated by reference 360, the retailer server 140 may be configured to determine directions, for example, driving directions, for the client based on the location of the store selected for the pickup and the current location of the client, for example, based on the GPS coordinates for the client's mobile communication device 130. The retailer server 140 transmits the directions, for example, in the form of a webpage map, to the client's mobile communication device 130, as indicated by reference 370. According to an embodiment, the intermediary server 120 is configured to determine and transmit directions for the store, as indicated by references 362 and 363 respectively, to the client's mobile communication device 130. According to another embodiment, the client's mobile communication device 130 is configured to determine directions for the selected store, as indicated by reference 364, for example, using a mapping program or component.

Figure 4:
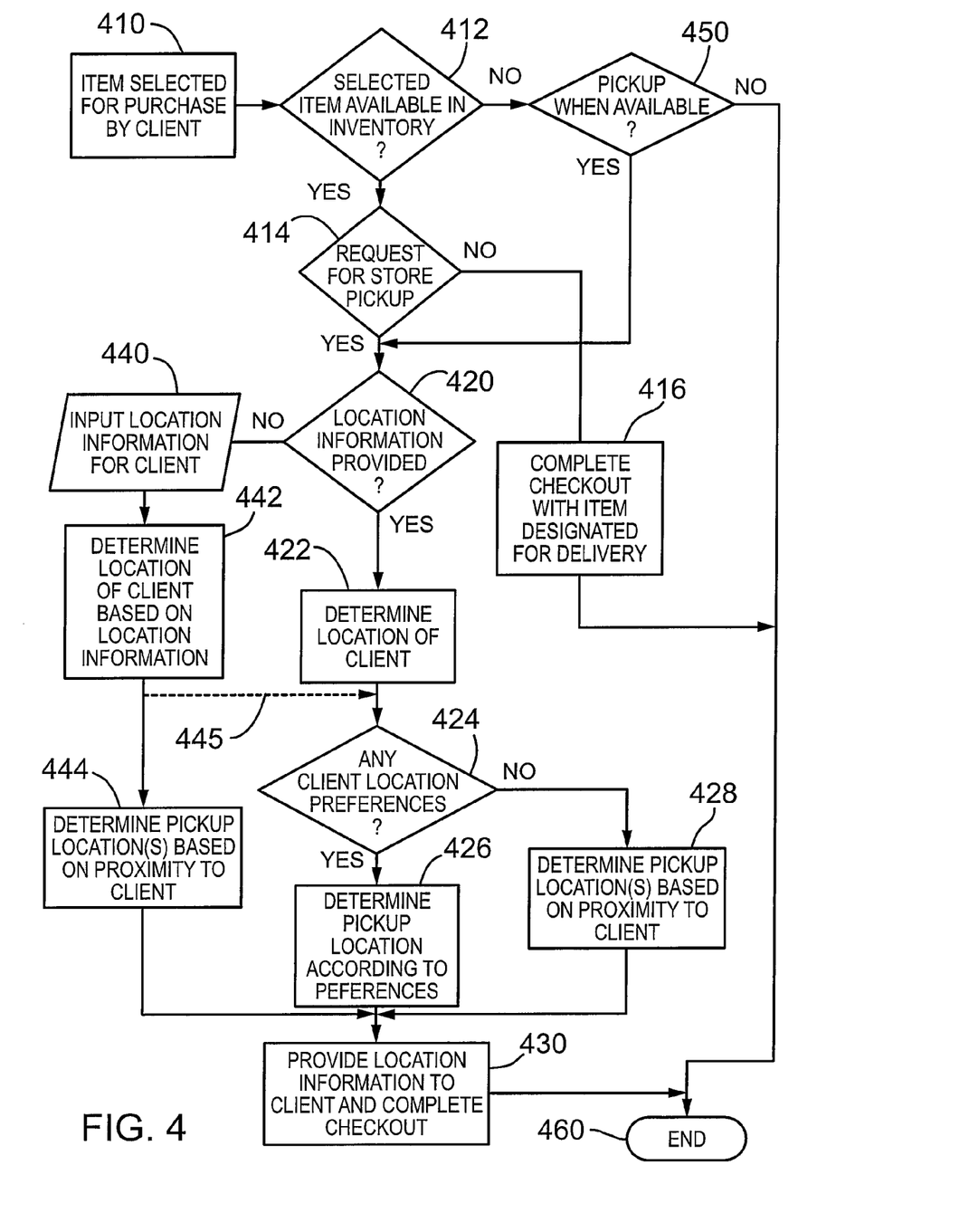
FIG. 4 shows in flowchart form process and logic flow for determining delivery location for a mobile communication device and server configuration according to another embodiment.

Reference is next made to FIG. 4, which shows in flowchart form a process and logic flow according to another embodiment. As indicated by reference 410, the client uses their mobile communication device 130 (FIG. 1) to select an item for purchase and the selected item is transmitted to the retailer server 140 (FIG. 1) for example in a shopping basket. The retailer server 140 is configured to determine if the selected item(s) are available in the retailer's inventory, as indicated by reference 412. According to an embodiment, the inventory availability is determined based on the physical location of the retailer's stores, pickup depots, distribution center or warehouse. If the selected item is available in the current inventory of the retailer, then the retailer server provides the client with the option requesting a store pickup, as indicated by reference 414. If the client does not wish to pick the item up from the retailer, then the checkout process is completed with the item designated for delivery to the client, as indicated by reference 416. If the selected item is not currently in stock, the retailer server 140 is configured according to an embodiment to provide the client with the option of deciding to pick up the item up when it comes back into inventory, as indicated by reference 450. If the client chooses to pick up the item when is it is restocked, then a pickup location is determined as described in more detail below. On the other hand, if the client chooses not to pick up the item when is it is restocked, the checkout process is terminated, as indicated by reference 460.

According to an embodiment, the retailer server 140 is configured to determine if location information for the mobile communication device 130 has been provided, as indicated by reference 420. If location information is provided, then a physical location for the client is determined as indicated by reference 422. As described above, the location of the client is determined based on the mobile communication device 130, for example, using the GPS coordinates of the device 130, or based on the location of the cellular tower in communication with the mobile device 130, or based on a pre-defined location provided or associated with the client. After the location of the client is determined, the next step involves determining the location of the store(s) the nearest or in proximity to the client. According to an embodiment, the physical locations available for pickup can be selected or filtered according to client location preferences. If there are client pickup location preferences as indicated by reference 424, then the pickup locations are determined according to the client preferences in 426. The client pickup location preferences can include specific physical store(s), a store in another city (i.e. outside the proximate area of the client), a store or location with extended hours, a store with our departments or types of goods for personal shopping by the client. If there are no client location preferences, then the pickup location(s) are determined based on proximity to the client as indicated by reference 428. Then as indicated by reference 430, the location information for the available pickup location(s) is provided to the client and the checkout is completed for example as described above.

Referring again to FIG. 4, if client location is not provided (as determined in 420), then the client is prompted to input location information as indicated by reference 440. According to an embodiment, the retailer server 140 is configured to prompt the client for the location information. According to another embodiment, the mobile communication device 130 is configured to prompt the client to enter location information and transmit the location information to the retailer server 140. According to another embodiment, the location information comprises pre-defined location information, such as, the client's home address or the client's work address. The retailer server 140 determines the location of the client based on the location information as indicated by reference 442. If client location preferences are to be considered, then processing proceeds to 424 as indicated by reference 445. Otherwise, the retailer server 140 determines the pickup location(s) based on proximity to the client as indicated by reference 444, and the location information for the available pickup location(s) is provided to the client and the checkout is completed in 430, for example as described above.

The operation of the configuration of a mobile communication device and the retailer server, for example, according to embodiments described in FIGS. 3 and 4, is further illustrated with reference to FIG. 1. In a first example, the user (i.e. client) associated with the mobile communication device 130-1 has made an online or electronic purchase from the retailer. The online purchase was made, for example, in a manner as described above. As part of the transaction, for example, the checkout process, the user has requested a store pickup of the item. In response, the retailer server 140 has determined that the nearest pickup location with the purchased item in stock is the retailer pickup depot 152. As described above, the retailer server 140 is configured to determine the retailer pickup depot 152 as the nearest (as indicated by reference 151) physical location based on the location of the client's mobile communication device 130-1 (or based on the pre-defined location associated with the client), for example, using GPS coordinates. And in response to the client accepting this location during checkout, the item is reserved for the client at this location. In another example, the client associated with the mobile communication device 130-4 has made an online or electronic purchase from the retailer. As part of the transaction, the retailer server 140 determined that the physical locations in proximity of the client (based on the location of the client's mobile communication device 130-4 or based on the pre-defined location) are the retailer stores 150-1 and 150-2, with the retailer store 150-1 being the nearest as indicated by reference 153. In accordance with an embodiment, the retailer server 140 is configured to provide the client with the capability to choose either one of the stores 150-1 or 150-2. While the retailer store 150-1 may be nearer, the client may wish to pick up from the other retailer store 150-2, for example, because the retailer store 150-2 is in the vicinity of another store that the client has to visit. In a further example, the client associated with the mobile communication device 130-4 has made an online or electronic purchase of an item that the retailer does not currently have in stock in any of the retailer stores 150-1 and 150-2, but stock is available at the distribution center or warehouse 154. As part of the checkout process, the client has requested "pickup when available" (for example, as indicated by reference 450 in FIG. 4) from the retailer pickup depot 152 for the retailer. The retailer server 140 is configured to initiate the transfer of the purchased item from the warehouse 154 to the pickup depot 152 as indicated by 155. The retailer server 140 is also configured to notify the client when the item is available for pick up at the depot 152. The retailer server 140 may also be configured to indicate to the client the expected date that the item will be available at the pickup depot 152. According to another aspect, the client may not wish to wait for the transfer of item and the retailer server 140 is configured is accept the client's request to pick up the item at the warehouse 154.

The functionality and features associated with the mobile communication device and/or the server as described above in accordance with the embodiments may be implemented in the form of one or more software objects, components, or computer programs or program modules in the retailer server and/or the mobile communication device. Further, at least some or all of the software objects, components or modules can be hard-coded into processing units and/or read only memories or other non-volatile storage media in the mobile communication device, server and/or other components or modules depicted in the drawings. The specific implementation details of the software objects and/or program modules will be within the knowledge and understanding of one skilled in the art.

Figure 5:
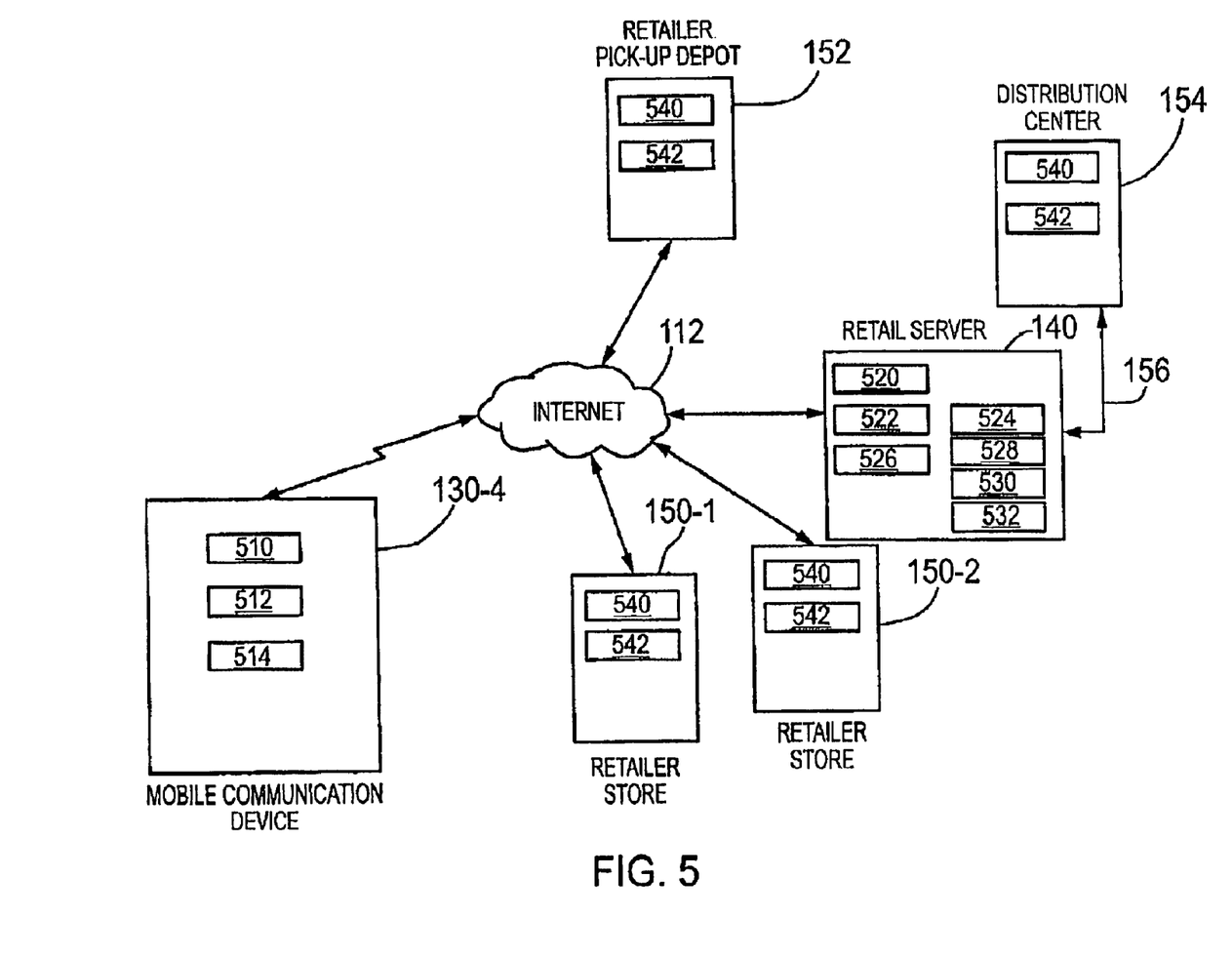
FIG. 5 shows processing aspects of the system of FIG. 1 in greater detail.

Reference is next made to FIG. 5, which shows the system of FIG. 1 redrawn to show processing elements or components and data files associated with the retailer server 140, one of the mobile communication devices 130-4, the retailer stores 150-1 and 150-2, the retailer pick-up depot 152 and the distribution center 154, according to an embodiment. The processing elements and data files can be implemented using any suitable programming language in software, firmware, and/or a combination of software/firmware, and can be realized in suitable hardware, firmware/software, and/or firmware/software logic blocks, objects, modules or field programmable or configurable logic components or in combination thereof.

As depicted in FIG. 5, the mobile communication device 130-4 executes a process 510 configured to determine a location associated with the device 130 (it will be appreciated that the location of the device is used to provide a location for the user). As described above, the process 510 can determine location according to the GPS module 260 (FIG. 2) or according to cell tower location techniques. According to an embodiment, the process 510 is implemented as a component or module in the plug-in 224 (FIG. 2). The location can be saved in a data file 512 and transmitted by the browser 222 (or the API according to another embodiment) to the retailer server 140 via the wireless infrastructure (not shown in FIG. 5) and the Internet 112.

As shown in FIG. 5, the retailer server 140 includes a process 520 configured to determine or obtain one or more locations associated with the retailer system. The locations comprise locations of retailer stores 150, the pick-up depot 152 and/or the distribution center 154, and are stored in a data file indicated by reference 522. The data file 522 is configured at the retailer server 140. The retailer server 140 includes a process or processing module 524 configured to determine one or more locations based on proximity to location data (512) received from the mobile communication device 130-4. The retailer server 140 also includes a process or processing module 526 configured to determine availability of one or more selected items at the locations associated with the retailer system. As depicted in FIG. 5, the retailer server 140 includes a data file 528 configured to store location data for the one or more of the locations associated with the retailer having the selected item(s) in stock or available for pickup. According to an embodiment, the associated locations, for example, the distribution center 154, the retailer pick-up depot 152 and the retailer stores 150-1, 150-2 include a respective process 540 configured to determine availability of the item and the process 540 is configured to transmit the item availability data or information to the retailer server 140, for example, via the Internet or a dedicated communication link 156. According to an embodiment, the retailer server 140 presents the locations having the item "in stock", or available for pickup, to the mobile communication device 130-4 and the mobile communication device 130-4 includes a process or processing module 514 configured to select one of the locations for pickup of the item. The processing module 514 can be configured to determine the pickup location according to location proximity, a user input and/or a user preference. According to another embodiment, the retailer server 140 includes a process or processing module 530 for selecting one of the locations based on proximity, a user input or a user preference. Based on the selected location, the retailer server 140 executes a process or processing module 532 configured to reserve or hold the selected item at the selected pickup location. The processing module 532 transmits the location data for the selected location to the mobile communication device 130-4. According to an embodiment, each of the pickup locations include a process or processing module 542 configured to be responsive to the retailer server 140 (i.e. the process 532) to reserve or hold the selected item for pickup. According to an embodiment, the processing module 532 is implemented as a component of a checkout processing module. According to another embodiment, the retailer server 140 includes a separate checkout processing module configured to perform the checkout processing.

While the embodiments according to the present application have been described in the context of an electronic device comprising a mobile communication devices, the embodiments may be extended or find application in other client-device configurations, such as, a client using a desktop computer located in the client's home or office, or a client using a notebook computer on the road, e.g. in a hotel on business trip, or another type of network-configured or network communication enabled device.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A computer-implemented method for selecting a pickup location during a checkout procedure for purchasing an item in an online transaction from a mobile communication device, said method comprising:

selecting an item for purchase from a single retailer, wherein said single retailer comprises a plurality of retailer locations;

initiating a checkout procedure for purchasing said selected item, said checkout procedure including the step of providing payment information to said single retailer;

obtaining, by a server associated with the single retailer, retailer location data associated with at least some of said plurality of retailer locations for said single retailer only;

providing device location data associated with the mobile communication device;

determining one or more potential retailer locations for pickup of said selected item based on said device location data and said retailer location data;

determining, by the server, whether said selected item is currently available at said one or more potential retailer locations associated with said single retailer;

providing the mobile communication device with said one or more potential retailer locations determined to have current item availability and said one or more potential retailer locations determined not to have current availability with expected item availability dates; and selecting from the mobile communication device one of said plurality of retailer locations, the selecting of one of said plurality of retailer locations occurring after the selecting of the item for purchase and the initiating of the checkout procedure; and completing, by the server, the checkout procedure by processing said provided payment information and making the selected item available at said selected retailer location.

2. The computer-implemented method as claimed in claim 1, wherein said step of determining one or more potential retailer locations for pickup comprises processing said device location data and said retailer location data to determining one or more retailer locations within a proximate distance to the location of said mobile communication device.

3. The computer-implemented method as claimed in claim 2, wherein said step of providing device location data associated with the mobile communication device comprises determining a current location based on one or more of GPS location data or cellular tower location data associated with the mobile communication device.

4. The computer-implemented method as claimed in claim 1, wherein said step of determining one or more potential retailer locations for pickup comprises selecting a pre-defined location set by the user of the mobile communication device.

5. The computer-implemented method as claimed in claim 4, wherein said pre-defined location is transmitted from the mobile communication device and overrides the device location data.

6. The computer-implemented method as claimed in claim 4, wherein said pre-defined location is stored in a server accessed by said retailer.

7. The computer-implemented method as claimed in claim 1, wherein said step of obtaining location data comprises receiving data for a client location from the mobile communication device.

8. The computer-implemented method as claimed in claim 1, further including the step of providing the mobile communication device with directions to said selected retailer location.

9. The computer-implemented method as claimed in claim 1, wherein said step of determining one or more retailer system associated locations is executed in response to an in-store pickup request from the client.

10. The computer-implemented method as claimed in claim 1, further including the step of providing an option of a future pickup if the item is not available at said one or more of said plurality of retailer locations.

11. An electronic device configured for selecting a pickup location during a checkout procedure for purchasing an item in an online transaction with a retailer chain comprising a plurality of retailer locations, said electronic device comprising:
- a component configured to select an item for purchase from said retailer chain and transmit data for said selected item to a retailer server associated with said retailer chain;
- a component configured to initiate a checkout procedure for purchasing said selected item, and including a component to generate payment information for said retailer server;
- a component configured to transmit location data associated with the electronic device to said retailer server;
- a component configured to receive from the retailer server one or more potential retailer locations for pickup of said selected item based on said device location data and said retailer location data;
- a component configured to transmit an availability request for said selected item at said one or more potential retailer locations associated with said single retailer and receive from the retailer server said one or more potential retailer locations determined to have current item availability and said one or more potential retailer locations determined not to have current availability with expected item availability dates;
- a component configured to select one of said one or more potential retailer locations, the selecting of one of said one or more potential retailer locations occurring after the selecting of the item for purchase and the initiating of the checkout procedure; and
- a component configured to transmit said payment information to said retailer server and complete said checkout procedure.

12. The electronic device as claimed in claim 11, wherein said device location data comprises a physical location for the electronic device.

13. The electronic device as claimed in claim 12, wherein said device location data comprises a physical location defined by a client using the electronic device.

14. The electronic device as claimed in claim 13, wherein said device comprises a mobile communication device operatively coupled to a communication network with said retailer server.

15. A server for determining a pickup location during a checkout procedure for the purchase of an item in an online transaction from a mobile communication device operatively coupled to a communication network, wherein the item is selected from a retailer chain having a plurality of geographically dispersed retailer locations, said server comprising:
- a computer operatively coupled to the communication network and configured to execute a plurality of code modules;
- a code module configured to process a checkout request from the mobile communication device for the selected item;
- a code module configured to receive payment information from the mobile communication device;
- a code module configured to obtain device location data for the mobile communication device;
- a code module configured to obtain retailer location data for one or more of said plurality of geographically dispersed retailer locations having the selected item available for purchase;
- a code module configured to determine one or more potential retailer locations for pickup of the selected item based on said device location data and said retailer location data;
- a code module to determine whether said selected item is currently available at said one or more potential retailer locations associated with said single retailer;
- a code module to provide to the mobile communication device said one or more potential retailer locations determined to have current item availability and said one or more potential retailer locations determined not to have current availability with expected item availability dates;
- a code module configured to select one of said potential retailer locations for pickup of the selected item in response to an input from the mobile communication device, the selecting of one of said potential retailer locations occurring after the selection of the item and the processing of the checkout procedure;
- a code module configured to process said payment information and complete said checkout request; and
- a code module configured to reserve said selected item for pickup at said selected retailer location.

16. The server as claimed in claim 15, further including a code module configured to provide directions to said selected retailer location at the mobile communication device.

17. The server as claimed in claim 15, further including a code module configured to select one or more of said plurality of geographically dispersed retailer locations for a future pickup if the selected item is not available for purchase.

18. A non-transitory computer readable medium containing executable instructions for selecting a pickup location during a checkout procedure for purchasing an item in an online transaction from using a mobile communication device, said computer readable medium comprising:
- a storage medium configured to store computer readable instructions executable by a processor,
- said computer instructions comprising,
- selecting an item for purchase from a single retailer, wherein said single retailer comprises a plurality of retailer locations;
- initiating a checkout procedure for purchasing said selected item, said checkout procedure including the step of providing payment information to said single retailer;
- obtaining retailer location data associated with at least some of said plurality of retailer locations for said single retailer only;
- providing device location data associated with the mobile communication device;
- determining one or more potential retailer locations for pickup of said selected item based on said device location data and said retailer location data;
- determining whether said selected item is currently available at said one or more potential retailer locations associated with said single retailer,
- providing the mobile communication device with said one or more potential retailer locations determined to have current item availability and said one or more potential retailer locations determined not to have current availability with expected item availability dates; and
- selecting from the mobile communication device one of said plurality of retailer locations, the selecting of one of said plurality of retailer locations occurring after the selecting of the item for purchase and the initiating of the checkout procedure; and
- completing the checkout procedure by processing said provided payment information and making the selected item available at said selected retailer location.

19. The non-transitory computer readable medium as claimed in claim 18, wherein said executable instruction of determining one or more potential retailer locations for pickup comprises processing said device location data and said retailer location data to determine one or more retailer locations within a proximate distance to the location of said mobile communication device.

20. The non-transitory computer readable medium as claimed in claim 18, wherein said executable instruction of determining one or more potential retailer locations for pickup comprises selecting a pre-defined location set by the user of the mobile communication device.

21. The non-transitory computer readable medium as claimed in claim 20, wherein said pre-defined location is transmitted from the mobile communication device and overrides the device location data.

* * * * *